(12) United States Patent
Sakayori et al.

(10) Patent No.: US 11,550,296 B2
(45) Date of Patent: Jan. 10, 2023

(54) NUMERICAL CONTROLLER

(71) Applicant: Fanuc Corporation, Yamanashi (JP)

(72) Inventors: Yuuki Sakayori, Yamanashi (JP); Akira Kanemaru, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 568 days.

(21) Appl. No.: 16/568,584

(22) Filed: Sep. 12, 2019

(65) Prior Publication Data

US 2020/0089197 A1    Mar. 19, 2020

(30) Foreign Application Priority Data

Sep. 18, 2018  (JP) .............................. JP2018-174185

(51) Int. Cl.
| | | |
|---|---|---|
| *G05B 19/414* | (2006.01) | |
| *G06F 9/46* | (2006.01) | |
| *G05B 19/04* | (2006.01) | |
| *G05B 19/4093* | (2006.01) | |

(52) U.S. Cl.
CPC ......... *G05B 19/4147* (2013.01); *G05B 19/04* (2013.01); *G05B 19/4093* (2013.01); *G05B 19/4145* (2013.01); *G06F 9/46* (2013.01); *G05B 2219/30* (2013.01)

(58) Field of Classification Search
None
See application file for complete search history.

(56) References Cited

U.S. PATENT DOCUMENTS

2017/0255459 A1    9/2017  Tanimoto et al.

FOREIGN PATENT DOCUMENTS

| | | |
|---|---|---|
| EP | 0829789 A1 | 3/1998 |
| JP | 5224729 A | 9/1993 |
| JP | 8-137513 A | 5/1996 |
| JP | 9212226 A | 8/1997 |
| JP | 2017156908 A | 9/2017 |

OTHER PUBLICATIONS

Colley et al., "Evacuation: A software strategy to support fault-tolerant transputer systems", Research Gate Dec. 1994 (Year: 1994).*
Japanese Decision to Grant a Patent for Japanese Application No. 2018-174185, dated Dec. 8, 2020, with translation, 5 pages.

* cited by examiner

*Primary Examiner* — Carlos R Ortiz Rodriguez
(74) *Attorney, Agent, or Firm* — RatnerPrestia

(57) ABSTRACT

A numerical controller includes an activation unit that builds a memory map according to settings when the power is on; a change detection unit that detects an operation requiring reconstructing of the memory map; a task control unit that, when the operation is detected, performs a stopping process of a task being operated; and a memory map control unit that, after the task has stopped, acquires a backed up memory, reconstructs the memory map according to the setting, and compares the reconstructed memory map and the backed-up memory map, and resets information required for operating the task again such as a program counter.

4 Claims, 5 Drawing Sheets

NUMERICAL CONTROLLER

RELATED APPLICATION

The present application claims priority to Japanese Application Number 2018-174185 filed Sep. 18, 2018, the disclosure of which is hereby incorporated by reference herein in its entirety.

BACKGROUND OF THE INVENTION

1. Field of the Invention

The present invention relates to a numerical controller, and more particularly to a numerical controller having a function of safely reconstructing a memory map.

2. Description of the Related Art

At the time of power-on, most information processing apparatuses in which embedded software is installed determine a software configuration, a code area, sizes and addresses of a work area according to preset parameters and options. These memory locations are referred to as a memory map. It is designed to improve reliability and stability by fixing the memory map.

Similarly to the above information processing apparatuses, improvement of reliability and stability is improved by fixing the numerical controller that controls an industrial machine including a machine tool (hereinafter simply referred to as a machine) is achieved by fixing the memory map such as a code area and a work area. (see, for example, Japanese Patent Application Laid-Open No. 08-137513). In the method of acquiring memory dynamically without fixing the memory map, for example, a lot of memory is secured by one function, and even if you an attempt is made to acquire the memory by another function, acquisition of memory fails or the like depending on the state of the numerical controller, and consequently, unintended behavior may occur. In addition, when the operation becomes unstable, the same result is not always obtained even if the same processing program is operated, and the reproducibility is reduced.

However, when the memory map is fixed, it is necessary to restart the numerical controller in order to reconstruct the memory map each time the parameter or option setting is changed during the operation of the numerical controller. For example, since the setting needs to be changed frequently when the machine tool is started, the numerical controller is repeatedly restarted, which places a burden on the operator. Furthermore, when restarting the numerical controller, it is also necessary to restart the peripheral devices connected to the numerical controller or the machine tool at the same time. At this time, it often takes much time for all peripheral devices to start up.

Currently, it is common to determine the memory map when the numerical controller is powered on, but in order to avoid the problems described above, it is sufficient to reflect changes in parameters and options without restarting the numerical controller. In order to reconstruct the memory map during operation of the numerical controller, it is necessary to stop the memory access of a CPU. If the memory map is reconstructed without stopping the memory access by the CPU, the program counter (FIG. 4(a)) to which the CPU points immediately before the repartition becomes an abnormal value at the next moment (FIG. 4(b)), which may cause a failure.

It takes a considerable amount of time to stop the memory access of the CPU and perform the same processing as when the power is on during operation of the numerical controller. During that time, processing that requires a response in real time and responses to connected peripheral devices cannot be performed at all (FIG. 5). If there is no response from the numerical controller, for example, there is a possibility that the peripheral devices may view the numerical controller to have an abnormality or the like and stop the operation (FIG. 6).

SUMMARY OF THE INVENTION

The invention is intended to solve such problems, and it is an object to provide a numerical controller having a function of safely reconstructing a memory map.

A numerical controller according to an embodiment of the invention includes an activation unit that builds a memory map according to settings when the numerical controller is powered on; a change detection unit that detects an operation requiring reconstructing of the memory map; a task control unit that, when the operation is detected, performs a stopping process of a task being operated; and a memory map control unit that, after the task has stopped, acquires a backup of the memory map, reconstructs the memory map according to the setting, and compares the reconstructed memory map and the backed-up memory map, and resets information required for operating the task again such as a program counter.

In the numerical controller according to an embodiment of the invention, the task control unit restarts the stopped task after the completion of the processing by the memory map control unit.

The numerical controller according to an embodiment of the invention further includes a peripheral device communication unit that performs communication with peripheral devices while the memory map control unit reconstructs the memory map, in which the communication is executed by arranging the backed-up memory map in a memory area different from a memory area of the memory map being reconstructed and further developing a program for executing the communication.

According to the invention, it is possible to provide a numerical controller having a function of safely reconstructing a memory map.

BRIEF DESCRIPTION OF THE DRAWINGS

The above and other objects and features of the invention will be apparent from the following description of embodiments with reference to the accompanying drawings. Of those figures.

DETAILED DESCRIPTION OF THE PREFERRED EMBODIMENTS

Figure 1:
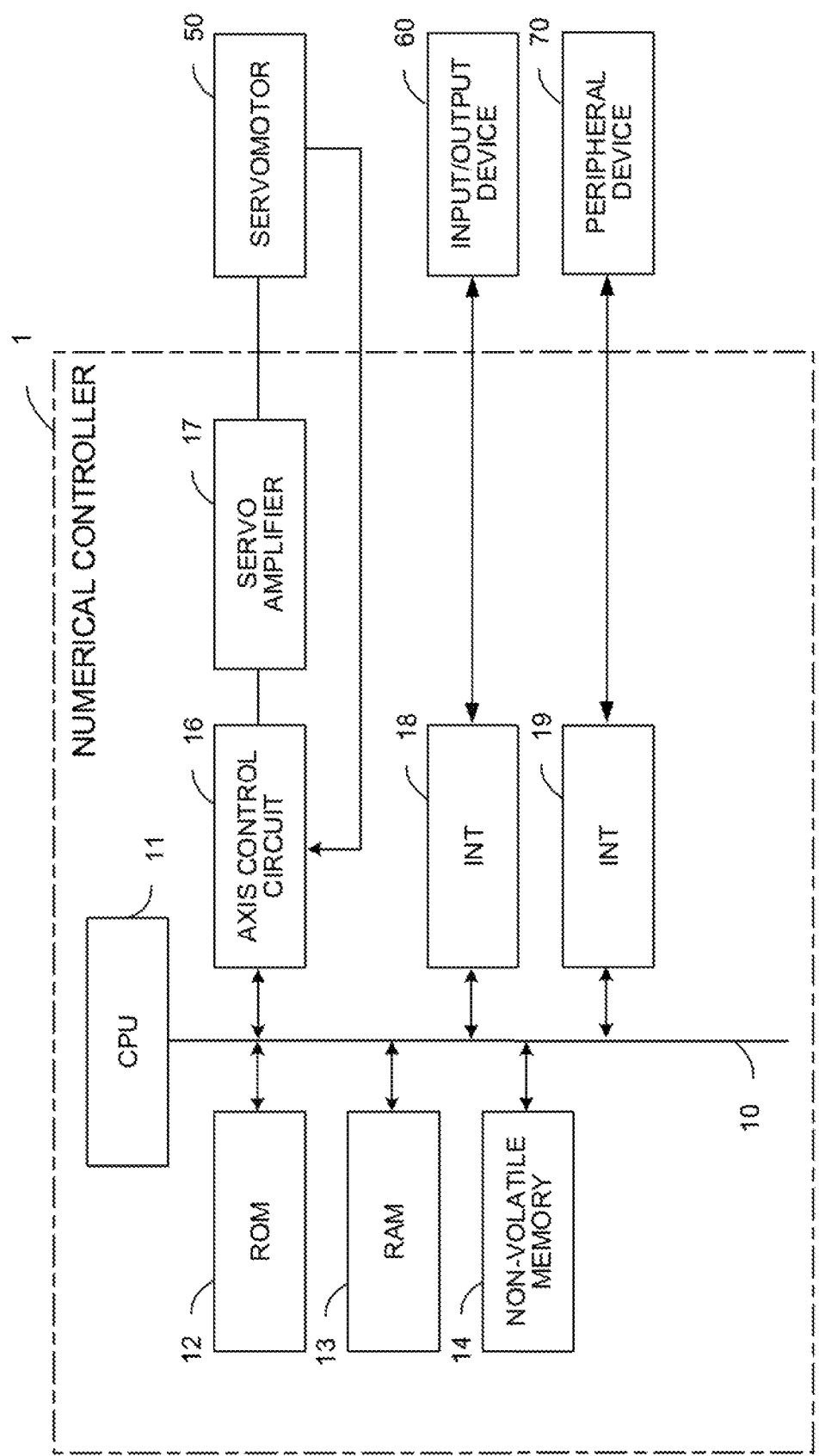
FIG. 1 is a diagram illustrating an example of a hardware configuration of a numerical controller.

FIG. 1 is a schematic hardware configuration diagram showing a main part of the numerical controller 1 according to the first embodiment. The numerical controller 1 is a device that controls an industrial machine including a machine tool. The numerical controller 1 includes a CPU 11, a ROM 12, a RAM 13, a non-volatile memory 14, a bus 10, an axis control circuit 16, a servo amplifier 17, an interface 18, and an interface 19. A servomotor 50, an input/output device 60, and one or more peripheral devices 70 are connected to the numerical controller 1.

The CPU 11 is a processor that controls the numerical controller 1 as a whole. The CPU 11 reads the system program stored in the ROM 12 via the bus 10, and controls the entire numerical controller 1 according to the system program.

The ROM 12 stores, for example, a system program for executing various controls of the machine.

The RAM 13 temporarily stores temporary calculation data and display data, data and programs input by the operator via the input/output device 60, and the like.

The non-volatile memory 14 is backed up by, for example, a battery, not shown, and retains the stored state even if the power of the numerical controller 1 is shut off. The non-volatile memory 14 stores data, programs, and the like input from the input/output device 60. The program and data stored in the non-volatile memory 14 may be expanded on the RAM 13 at the time of execution and use.

The axis control circuit 16 controls the operating axis of the machine. The axis control circuit 16 receives an axis movement command amount output from the CPU 11, and outputs an operation axis movement command to the servo amplifier 17.

The servo amplifier 17 drives the servomotor 50 in response to an axis movement command output from the axis control circuit 16.

The servomotor 50 is driven by the servo amplifier 17 to move the operating axis of the machine. The servomotor 50 typically incorporates a position/speed detector. The position/speed detector outputs a position/speed feedback signal, which is fed back to the axis control circuit 16 to perform position/speed feedback control.

Although only one axis control circuit 16, one servo amplifier 17, and one servomotor 50 are shown in FIG. 1, in actually, these are prepared by the same number as the number of axes to be controlled provided in the machine.

The input/output device 60 is a data input/output device provided with a display, a hardware key and the like, and is typically an MDI or a control panel. The input/output device 60 displays the information received from the CPU 11 via the interface 18 on the display. The input/output device 60 passes a command, data, etc. input from a hardware key or the like to the CPU 11 via the interface 18.

The peripheral device 70 is one or more peripheral devices connected to the numerical controller or the machine tool, and includes, for example, various sensors, timers, robots, and the like. The peripheral device 70 receives information from the CPU 11 via the interface 19. Information output by the peripheral device 70 is passed to the CPU 11 via the interface 19.

Figure 2:
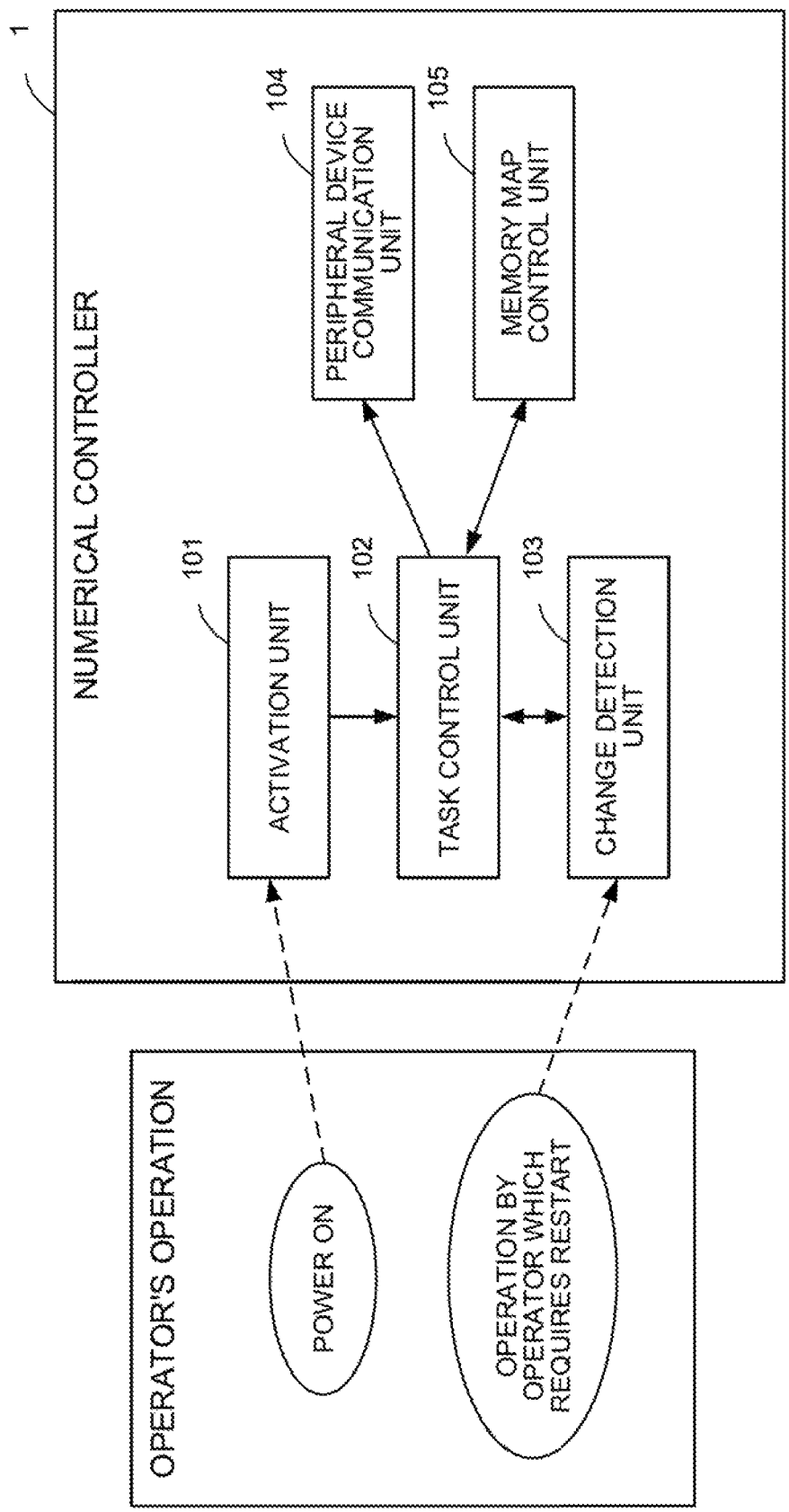
FIG. 2 is a diagram showing an example of a functional configuration of the numerical controller.

FIG. 2 is a block diagram showing a characteristic functional configuration of the numerical controller 1. The typical numerical controller 1 includes an activation unit 101, a task control unit 102, a change detection unit 103, a peripheral device communication unit 104, and a memory map control unit 105. A combination of these is a component enabled by the unique technology of the invention.

Figure 3:
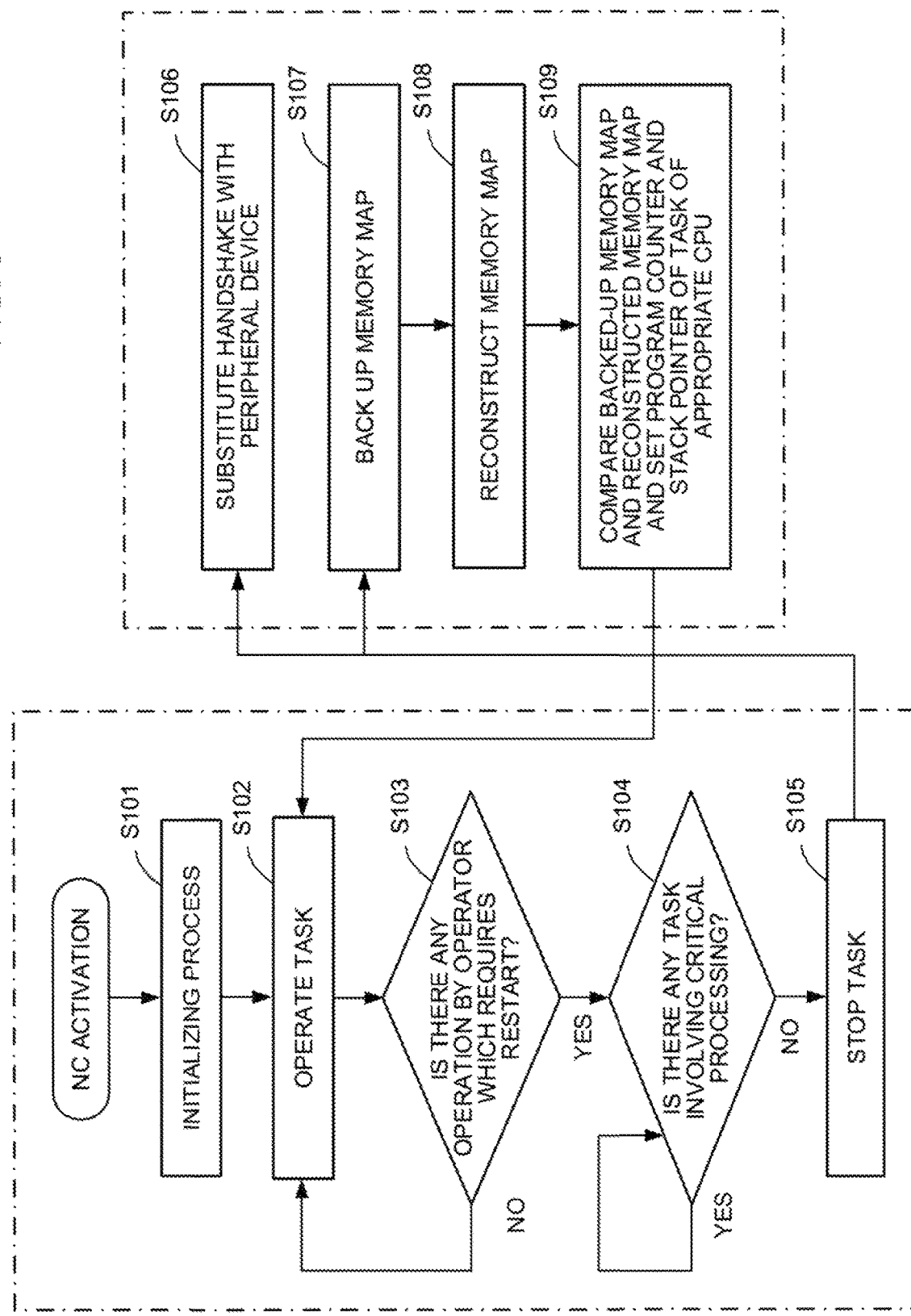
FIG. 3 is a flowchart showing an operation example of the numerical controller.
Figure 4:
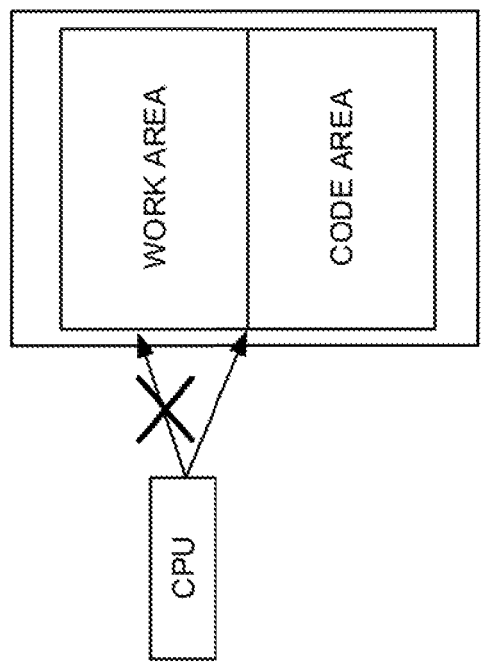
FIG. 4 is a diagram showing a problem in the related art.
Figure 4:
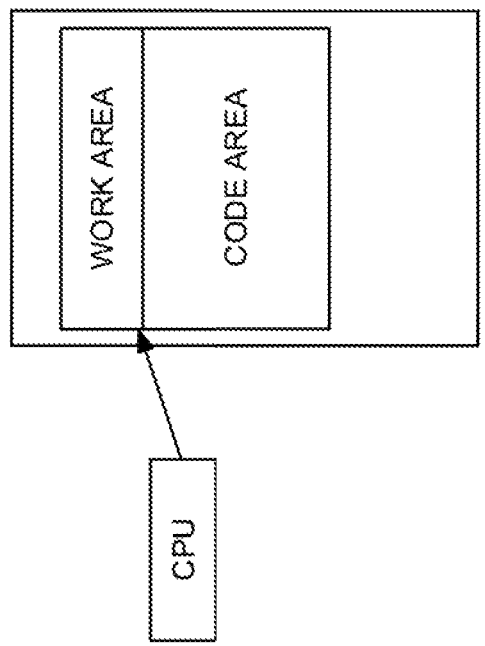
Figure 6:
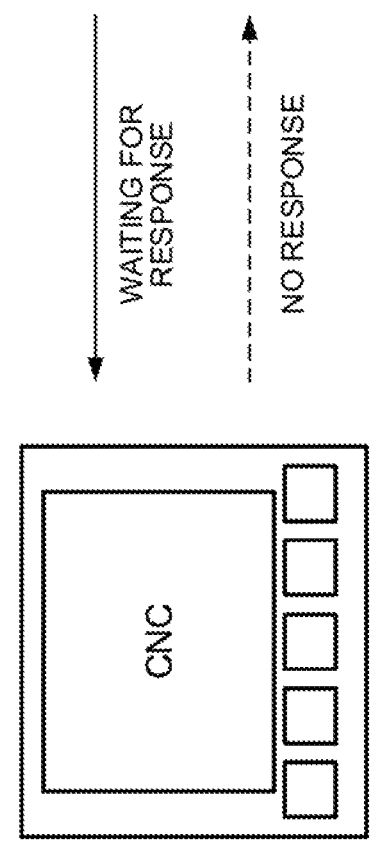
FIG. 6 is a diagram showing a problem in the related art.
Figure 5:
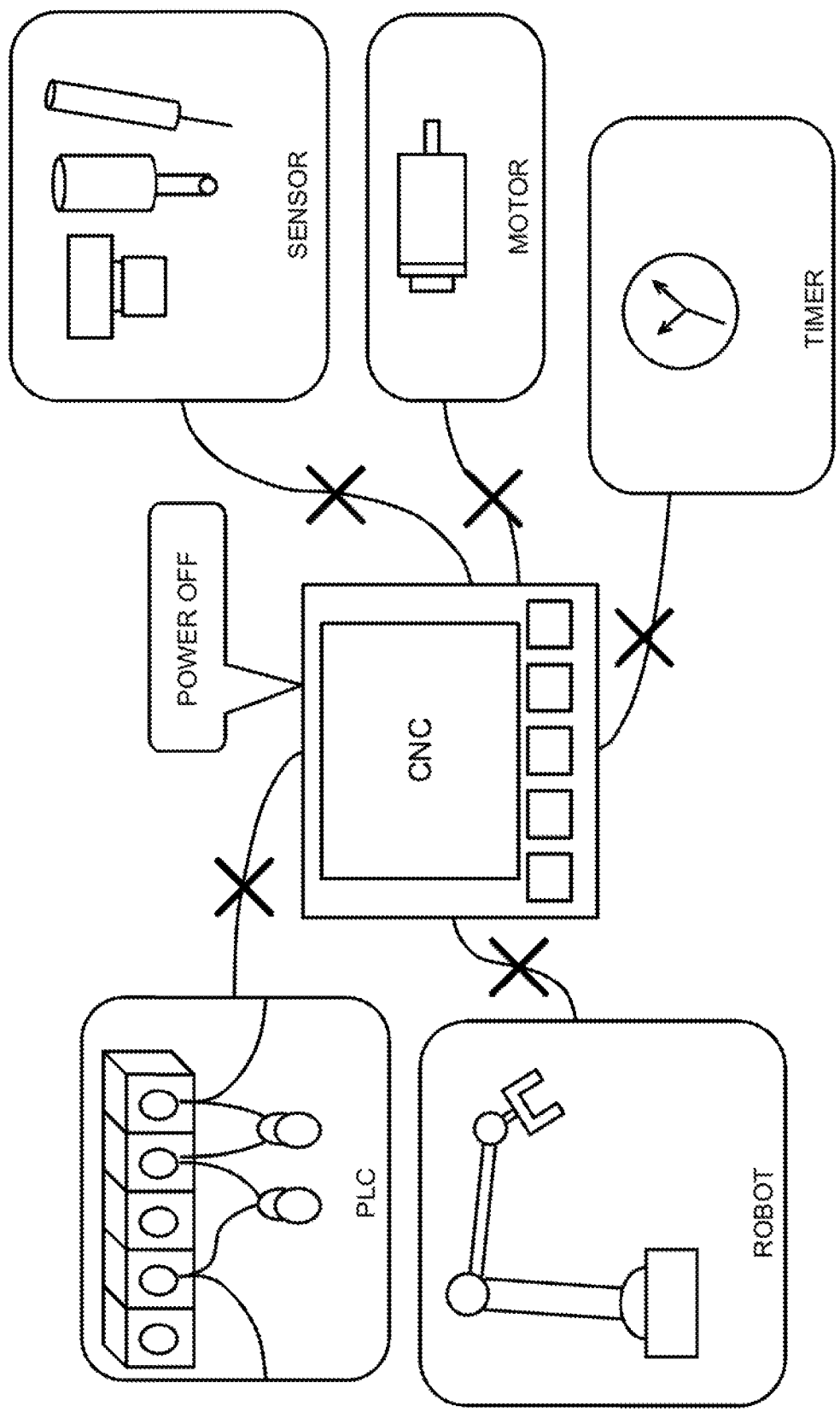
FIG. 5 is a diagram showing a problem in the related art.

The operation of each processing unit of the numerical controller 1 will be described in sequence with reference to the flowchart of FIG. 3. The flowchart in FIG. 3 can be roughly classified into processing in a left rectangle surrounded by the dashed dotted line and processing in a right rectangle surrounded by the dashed dotted line. Among these, the processing in the rectangle on the right side particularly includes the novel processing unique to the invention.

The activation unit 101 performs processing necessary when the numerical controller 1 is powered on (S101). For example, parameters and options stored in advance in the non-volatile memory 14 are read, software is loaded according to the settings, and a memory map of a code area and a work area is created. Furthermore, initialization of tasks and initialization of communication between the CPU 11 and the peripheral devices 70 are performed. After that, the activation unit 101 notifies the task control unit 102 of the completion of the processing to be executed at the time of power-on.

After the completion of the processing to be executed at the time of power-on, the task control unit 102 executes processing for activating the task (S102) or stopping the task according to the cycle and priority of the task. To stop the task, make sure that the active task is not performing critical processing and then stop it. If there is a task that is performing critical processing, it is stopped after the processing of the task is completed (S104 to S105). When the operator performs an operation requiring a restart (detected and notified by the change detection unit 103 described later), the task control unit 102 notifies the memory map control unit 105 that all tasks have stopped, and then asks to reconstruct the memory map.

The change detection unit 103 detects an operation by an operator that needs to be restarted (S103). An operation requiring a restart is an operation requiring a reconstruct of the memory map, and includes, for example, software installation. If an operation requiring restart is detected, the change detection unit 103 requests the task control unit 102 to stop all tasks in operation. When all tasks in operation stop, access to the memory area to be reconstructed by the CPU 11 is stopped, and safe reconstruction of the memory map is enabled.

While the memory map control unit 105 reconstructs the memory map, that is, while the CPU 11 stops the memory access to the memory area being reconstructed, the peripheral device communication unit 104 substitutes communication (handshake) between the peripheral device 70 and the numerical controller 1 (S106). For example, there are a process of invalidating a watchdog timer monitoring the state of the numerical controller 1 and a process of returning a response when a request or feedback is transmitted from the servo motor to the numerical controller 1. As a result, the peripheral device 70 can continue to operate while the numerical controller 1 is reconstructing the memory map without false recognition that the numerical controller 1 has stopped operating or the like.

The peripheral device communication unit 104 can execute this process using a memory area other than the memory area under reconstruction. That is, the peripheral device communication unit 104 secures a temporary memory map including a program and a work area for performing handshake processing with the peripheral device 70 in an area different from the memory map to be reconstructed. While the memory map control unit 105 is reconstructing the memory map, the peripheral device communication unit 104 performs handshake processing with the peripheral device 70 using the above-described temporary memory map.

The memory map control unit 105 controls the memory map. When requested by the task control unit 102 to reconstruct the memory map, the memory map control unit

105 acquires a backup of the memory map before starting reconstructing the memory map (S107). After that, the memory map control unit 105 reads parameters and options again, executes known pre-check processing (whether the memory map after reconstructing exceeds the usable memory size, etc.), and then loads software according to setting of the parameters and he options to reconstruct the memory map of the code area and the work area (S108).

After reconstructing the memory map, the memory map control unit 105 compares the backed up memory map with the reconstructed memory map, and the information necessary for causing the task or the CPU 11 to operate the task again such as an appropriate program counter are reset (S109). This makes it possible to operate the task safely. After that, the memory map control unit 105 requests the task control unit 102 to start the task (S102).

According to the present embodiment, even when an operation that requires the restart of the numerical controller 1 in the related art, that is, an operation that requires reconstruction of the memory map is performed, the memory map can be reconstructed while maintaining the connection with the peripheral device 70 without requiring the restart. As a result, the time required for restarting the numerical controller 1 (including the time required for restarting the peripheral devices, and the like) can be reduced, so that the burden on the operator can be reduced. In addition, it is possible to reduce the power consumption and the like accompanied with the restart.

Furthermore, according to the present embodiment, it is easy to attach and remove software and functions (such as dynamic download). In addition, since it is not necessary to restart the numerical controller 1 when performing fault handling, debugging, and the like or when updating software, it is possible to realize a more flexible usage form than in the related art.

As mentioned above, although the embodiment of the invention has been described, the invention can be implemented in another aspect by adding an appropriate change without being limited to the example of embodiment mentioned above.

The invention claimed is:

1. A numerical controller comprising:
a processor comprising:
an activation unit that builds a memory map according to settings when the numerical controller is powered on;
a change detection unit that detects an operation requiring restart, wherein the operation requiring restart is an operation requiring a reconstructing of the memory map;
a task control unit that, when the operation requiring restart is detected, performs a stopping process of a task being operated, wherein access to a memory area to be reconstructed is stopped; and
a memory map control unit that, after the task has stopped, acquires a backup of the memory map, reconstructs the memory map according to the setting of the numerical controller, compares the reconstructed memory map to the backed-up memory map, and resets, based on the comparison, information on the processor required for operating the task again.

2. The numerical controller according to claim 1, wherein the task control unit restarts the stopped task after the completion of the processing by the memory map control unit.

3. The numerical controller according to claim 1, further comprising
a peripheral device communication unit that performs communication with a peripheral device while the memory map control unit reconstructs the memory map, wherein
the communication is executed by arranging the backed-up memory map in a memory area different from a memory area of the memory map being reconstructed and further developing a program for executing the communication.

4. The numerical controller according to claim 1, wherein a program counter is reset to provide the information on the processor required for operating the task in accordance with the reconstructed memory map.

\* \* \* \* \*